(12) United States Patent
Korneev et al.

(10) Patent No.: US 11,741,273 B2
(45) Date of Patent: Aug. 29, 2023

(54) FABRICATED SHAPE ESTIMATION FOR DROPLET BASED ADDITIVE MANUFACTURING

(71) Applicant: Palo Alto Research Center Incorporated, Palo Alto, CA (US)

(72) Inventors: Svyatoslav Korneev, Stanford, CA (US); Vaidyanathan Thiagarajan, Palo Alto, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 312 days.

(21) Appl. No.: 16/898,994

(22) Filed: Jun. 11, 2020

(65) Prior Publication Data
US 2021/0390224 A1    Dec. 16, 2021

(51) Int. Cl.
G06F 30/17  (2020.01)
G06N 3/04   (2023.01)
G06N 3/08   (2023.01)
G06F 119/18 (2020.01)

(52) U.S. Cl.
CPC .............. *G06F 30/17* (2020.01); *G06N 3/04* (2013.01); *G06N 3/08* (2013.01); *G06F 2119/18* (2020.01)

(58) Field of Classification Search
CPC ....... G06F 30/17; G06F 2119/18; G06N 3/04; G06N 3/08
See application file for complete search history.

(56) References Cited

U.S. PATENT DOCUMENTS

| 5,764,521 | A | 6/1998 | Batchelder et al. |
|---|---|---|---|
| 9,507,555 | B2 * | 11/2016 | Liu ..................... H04L 43/0817 |
| 9,886,526 | B2 | 2/2018 | Huang |
| 10,234,848 | B2 * | 3/2019 | Mehr ..................... B22F 10/00 |
| 10,434,573 | B2 | 10/2019 | Buller et al. |
| 11,150,633 | B2 | 10/2021 | De Souza Borges Ferreira et al. |
| 2009/0228416 | A1 * | 9/2009 | Nugent .................... G06N 3/08 706/26 |
| 2015/0269282 | A1 | 9/2015 | Nelaturi et al. |
| 2015/0269290 | A1 | 9/2015 | Nelaturi et al. |
| 2016/0320771 | A1 | 11/2016 | Huang |
| 2017/0011147 | A1 | 1/2017 | Kazama |

(Continued)

FOREIGN PATENT DOCUMENTS

WO     2018/217903     11/2018

OTHER PUBLICATIONS

X. Lin, K. Zhu, J. Zhou, J. Y. H. fuh, "Intelligent modeling and monitoring of micro-droplet profiles in 3D printing" (Herein referred as Lin et al), pp. 367-376, May 27, 2020 (Year: 2020).*

(Continued)

*Primary Examiner* — Kibrom K Gebresilassie
(74) *Attorney, Agent, or Firm* — Mueting Raasch Group

(57) ABSTRACT

A geometry of a substrate surface is received at a neural network. The neural network is trained using one or more training sets. Each training set comprises a different type of substrate geometry and a collection of manufacturing process parameters. The substrate is configured to receive at least one liquid droplet. A shape of the at least one droplet after it has been deposited on the substrate is determined based on the received geometry. An output representing the determined shape of the at least one droplet is produced.

20 Claims, 19 Drawing Sheets

(56) References Cited

U.S. PATENT DOCUMENTS

| | | | |
|---|---|---|---|
| 2017/0239891 | A1 | 8/2017 | Buller et al. |
| 2017/0252821 | A1 | 9/2017 | Sachs et al. |
| 2017/0368753 | A1 | 12/2017 | Yang et al. |
| 2018/0222110 | A1 | 8/2018 | Batchelder |
| 2018/0341248 | A1 | 11/2018 | Mehr et al. |
| 2019/0070787 | A1* | 3/2019 | Higgs, III ............. B33Y 50/02 |
| 2019/0298533 | A1* | 10/2019 | Kane .................... A61L 27/306 |
| 2020/0223143 | A1 | 7/2020 | Gurdiel Gonzalez et al. |
| 2021/0031507 | A1* | 2/2021 | Haik ...................... G06V 10/82 |
| 2021/0141970 | A1 | 5/2021 | Xu et al. |

OTHER PUBLICATIONS

S. Korneev, Z. Wang, V. Thiagarajan, S. Nelaturi, "Fabricated shape estimation for additive manufacturing processes with uncertainty" (Herein referred as Korneev et al), pp. 1-13, Apr. 16, 2020 (Year: 2020).*

X. Lin, K. Zhu, J. Zhou, J. Y. H. fuh, "Intelligent modeling and monitoring of micro-droplet profiles in 3D printing" pp. 367-376, May 27, 2020 (Year: 2020).*

S. Korneev, Z. Wang, V. Thiagarajan, S. Nelaturi, "Fabricated shape estimation for additive manufacturing processes with uncertainty", pp. 1-13, Apr. 16, 2020 (Year: 2020).*

EP Search Report from EP Application No. 21175763.8 dated Oct. 21, 2021, 11 pages.

Korneev et al., "Fabricated Shape Estimation for Additive Manufacturing Processes with Uncertainty", Computer-Aided Design, vol. 127, May 21, 2020, 13 pages.

Lin et al., "Intelligent Modeling and Monitoring of Micro-Droplet Profiles in 3D Printing", ISA Transactions, May 2020, pp. 367-376.

Lu et al., "A Layer-To-Layer Model and Feedback Control of Ink-Jet 3-D Printing", IEEE Transactions on Mechatronics, vol. 20, No. 3, Jun. 1, 2015, pp. 1056-1068.

Shi et al., "Learning-Based Cell Injection Control for Precise Drop-on-Demand Cell Printing", Annals of Biomedical Engineering, vol. 46, No. 9, Jun. 5, 2018, pp. 1267-1279.

De Souza Borges Ferreira et al., "Automated Geometric Shape Deviation Modeling for Additive Manufacturing Systems via Bayesian Neural Networks", IEEE Transactions on Automation Science and Engineering, vol. 17, No. 2, Apr. 2020, pp. 584-598.

Wang et al., "In-situ droplet inspection and closed-loop control system using machine learning for liquid metal jet printing", Journal of Manufacturing Systems, vol. 47, Apr. 2018, pp. 83-92.

Zhu et al., "Machine learning in tolerancing for additive manufacturing", CIRP Annals, vol. 67, No. 1, May 2, 2018, pp. 157-160.

EP Search Report from EP Application No. 21160092.9 dated Aug. 16, 2021, 14 pages.

EP Search Report from EP Application No. 21175782.8 dated Oct. 29, 2021, 12 pages.

U.S. Office Action for U.S. Appl. No. 16/899,005, issued by the U.S. Patent and Trademark Office dated May 25, 2022; 15 pgs.

* cited by examiner

FABRICATED SHAPE ESTIMATION FOR DROPLET BASED ADDITIVE MANUFACTURING

TECHNICAL FIELD

The present disclosure is directed to the design of mechanical parts.

BACKGROUND

Recent advances in additive manufacturing technologies have triggered the development of powerful design methodologies allowing designers to create highly complex functional parts.

SUMMARY

Embodiments described herein involve a method comprising receiving a geometry of a substrate surface at a neural network. The neural network is trained using one or more training sets. Each training set comprises a different type of substrate geometry and a collection of manufacturing process parameters. The substrate is configured to receive at least one liquid droplet. A shape of the at least one droplet after it has been deposited on the substrate is determined based on the received geometry. An output representing the determined shape of the at least one droplet is produced.

Embodiments involve a method comprising receiving one or more training sets and a collection of manufacturing process parameters at a neural network and a collection of manufacturing process. Each training set comprises a different type of substrate surface geometry. The neural network is trained using the one or more training sets. A geometry of a substrate is received at the neural network. The substrate is configured to receive at least one liquid droplet. A shape of the at least one droplet after it has been deposited on the substrate is determined based on the received geometry. An output representing the determined shape of the at least one droplet is produced Embodiments involve a system comprising a processor. The system comprises a memory storing computer program instructions which when executed by the processor cause the processor to perform operations. The operations comprise receiving a geometry of a substrate surface at a neural network. The neural network is trained using one or more training sets. Each training set comprises a different type of substrate geometry and a collection of manufacturing process parameters. The substrate is configured to receive at least one liquid droplet. A shape of the at least one droplet after it has been deposited on the substrate is determined based on the received geometry. An output representing the determined shape of the at least one droplet is produced.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
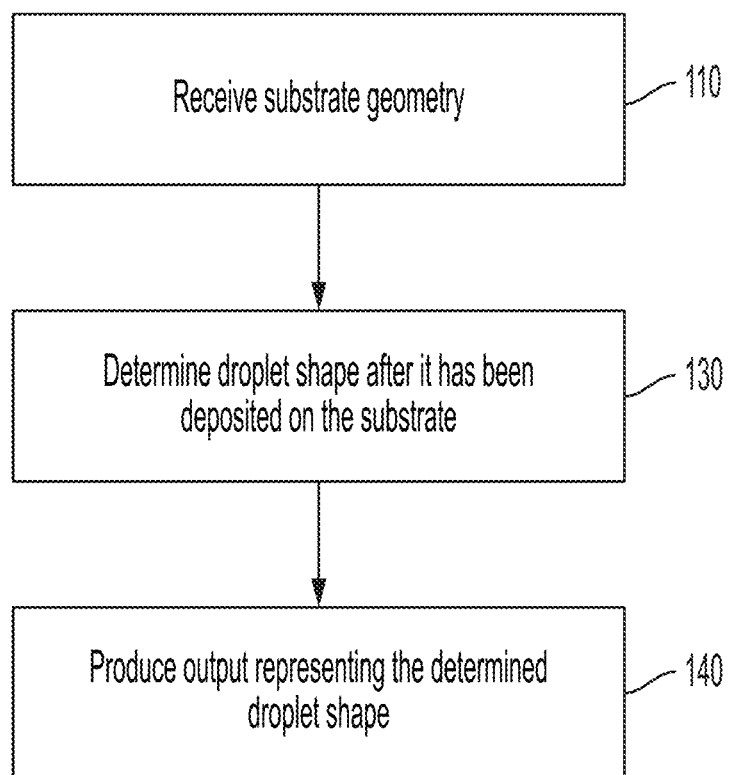
FIG. 1 shows a process for predicting the shape of a solidified droplet on a substrate in accordance with embodiments described herein.

The present disclosure relates to additive manufacturing (AM). Many such methods often operate under the assumption that any designed shape can be fabricated, e.g., using a 3D printer, and the resulting part matches the designed shape perfectly or with negligible errors. In reality, however, the selected AM process, mechanical characteristics of the printer or the material being used may introduce significant limitations to printability of a particular design in the form of a minimum printable feature size.

Embodiments described herein involve a computationally efficient algorithm for the estimation of as-printed shape in a droplet-based additive manufacturing process. Uncertainty in the manufacturing process may lead to a range of possible as-printed shapes. The present disclosure first describes the computation of the perfect as-printed shape, i.e. where the additive manufacturing machine exactly executes a given plan, and also describes the prediction of the as-printed shape when accounting for manufacturing imperfections such as variability in droplet deposition location, frequency, temperature, and other parameters. Prediction of the as-printed shape involves the solution of highly non-linear time dependent system of partial differential equations capturing complex physics such as multiphase flow and heat transfer in three dimensions. Solving such a complex system of equations on a high-end modern-day desktop computer is computationally expensive. For instance, simulating the droplet deposition physics of one droplet using a high-fidelity model involves approximately an hour of computer time. In order to simulate the building of a part, one may involve millions (or even billions) of droplets. Hence, to deal with such complexity, embodiments described herein involve an efficient reduced-order model for liquid droplet deposition physics based on hybrid machine learning. This reduced order model has an advantage of decreasing the computational time for simulating droplet deposition to 1 millisecond. Using this highly efficient reduced-order model enables estimation of the shape of the printed part in minutes, thereby enabling a user to visualize the result of a printing process plan without actually running the printer.

Embodiments described herein show a way to predict the shape of the solidified droplet under various conditions. One possible solution is to solve a high-fidelity model such as the thermo-fluidic multiphase model suitably tracking the solid-liquid interface. One simple way to model the solidification is by adding an extra temperature dependent momentum loss term to the Navier-Stokes equation. The drawback of such a high fidelity model is its high computational cost. In fact, a single droplet deposition simulation (using such models) can take more than an hour on a high-end modern desktop computer. Thus, to computer simulation of millions of droplets to predict the part shape is prohibitively expensive and hence not feasible. According to various embodiments, one could develop an analytical solution for the shape of the solidified droplet on a flat surface to predict the shape of the solidified droplet on a flat surface. These methods do not account for the effect of the substrate geometry. This is a limiting factor as the substrate geometry is found to have a high impact on the shape of the solidified droplet, and resulting mechanical properties.

FIG. 1 shows a process for predicting the shape of a solidified droplet on a substrate in accordance with embodiments described herein. A geometry of a substrate is received 110 at a neural network. The substrate is configured to receive at least one liquid droplet. The neural network may be trained using one or more training sets, each training set comprising a different type of substrate geometry, and a collection of manufacturing process parameters. According to various implementations, the training sets comprise one or more of a slightly curved surface, a highly curved surface, a rough surface, and a step-like surface. The received geometry of the substrate may be a 3D representation of the substrate.

A shape of the at least one droplet is determined 120 after it has been deposited on the substrate based on the received geometry. According to various embodiments, the shape comprises a 3D representation of the at least one droplet after it has deposited on the substrate. According to some implementations, determining a shape of the at least one droplet after it has been deposited on the substrate comprises determining the shape of the at least one droplet using one or more of a high-fidelity model and a steady-state model.

An output representing the determined shape of the at least one droplet is produced 130. The output may be a 3D representation of the shape obtained by determining the shape based on the received geometry. The shape of the as-printed part can be estimated using convolution of a probability density function of all possible droplet shapes with the tool path. This method also enables efficient estimation of part geometry. However, it is only a probability field describing the part geometry and does not capture the droplet level (local) influence on the as-printed part (global) geometry. According to embodiments described herein, a shape of a product part is estimated based on the output where the product part comprises a plurality of droplets.

High fidelity embodiments described herein have very high computational efficiency compared to more traditional approaches. This efficiency is achieved by reducing the model complexity using a hybrid machine learning approach. The core idea of this method is to train an Artificial Neural Network (ANN) to learn the steady-state shape of a liquid droplet falling on a substrate of arbitrary geometry. Specifically, the input to the network is the substrate geometry and the output from the network is the shape of the solidified droplet. Once the network is trained (which is a one-time effort), predicting the shape of the solidified droplet for any given geometry boils down to a set of matrix-vector multiplications/additions. These basic linear algebra operations can be performed very efficiently via parallelization (on the CPU and/or GPU cores). Thus, a trained network can predict the shape of the solidified droplet very efficiently. Another advantage of this approach is that the training data set can be obtained via a combination of high-fidelity model (such as thermo-fluidic multiphase flow simulation), simplified model (such as the steady-state shape of a liquid droplet) and/or actual experiments.

According to various embodiments, the training data set is generated based on a simplified steady state simulation of liquid droplet deposition on randomly generated substrate geometry. Although the steady-state simulation is computationally efficient, they do not capture all the relevant physics at the droplet-scale. Hence, to improve the accuracy of the steady state simulations, the training set may be augmented with the shape of the solidified droplet from direct experimental measurements. In some implementations, the steady-state model can be combined with the high-fidelity solution to further accelerate the generation of training data set.

The computational efficiency of embodiments described herein may be achieved by using a series of approximations and model order reductions. The dimension of the 3D droplet shape may be reduced to a 2D height field. It may be assumed that a solidified droplet does not change its shape. The latter assumption allows decoupling of the deposition events and thereby reduce the problem to the deposition of a single droplet on some curved surface. In general, the decoupling is not valid as the solidified droplet geometry depends on droplet deposition speed and rate of heat transfer from neighboring droplets. In other words, the decoupling is valid only when the frequency of droplet deposition is low and/or when the droplets are deposited in a non-overlapping fashion. The higher the frequency of the droplet deposition, higher is the heat flux and thereby inducing re-melting of solidified droplets. Droplet deposition in a nonoverlapping manner avoids re-melting as it avoids direct droplet interaction and thus local heat transfer. Thirdly, Artificial Neural Networks (ANN) are used to reduce the computational complexity of the droplet model. The neural network has two main components. The first component is the design of network architecture i.e. number/type of layers/neurons and its interaction. The second main component is the training data set employed to train the neural network.

Figure 2:
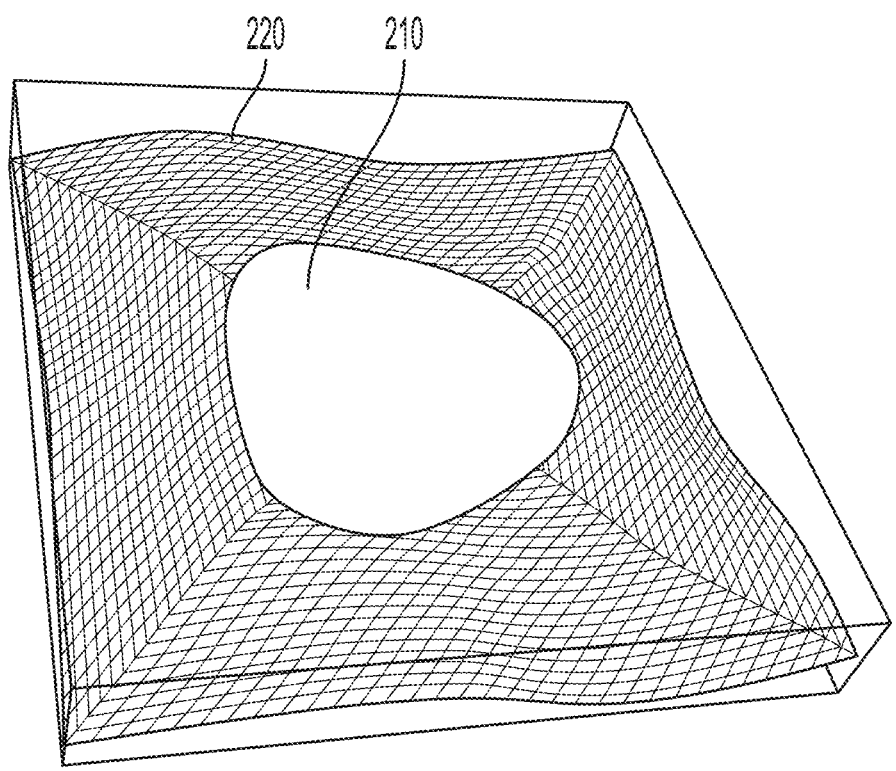
FIG. 2 shows an output simulation having the substrate and the droplet in accordance with embodiments described herein.

For an embodiment of the network structure, a combination of linear layers, hyperbolic tangent activation functions, convolution layers, and batch normalization layers. The final layer has ramp activation functions to suitably threshold the output. As part of this approach, the training set is created that includes the shape of the substrate as input and the height field of the solidified droplet as output. Here, the height is measured as the distance from the deposition substrate to a camera or sensor mounted above the substrate. To create the training set, software may be used to predict the steady-state shape of the droplet by minimizing the total droplet energy. The droplet energy may be computed by accounting for the effect of surface tension, pressure, and/or gravity. An output simulation having the substrate 220 and the droplet 210 is shown in FIG. 2.

Figure 3A:
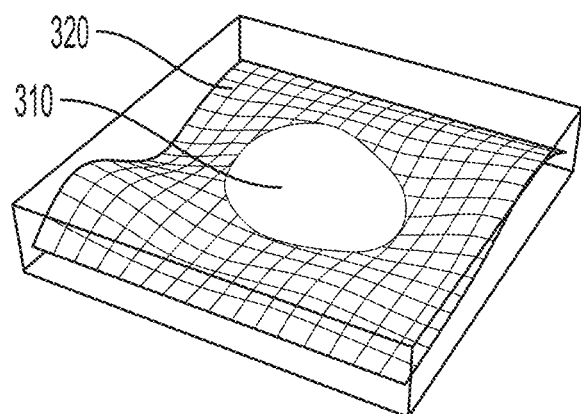
FIGS. 3A, 3B, and 3C show examples of substrate geometries representative of the three training sets in accordance with embodiments described herein.
Figure 3B:
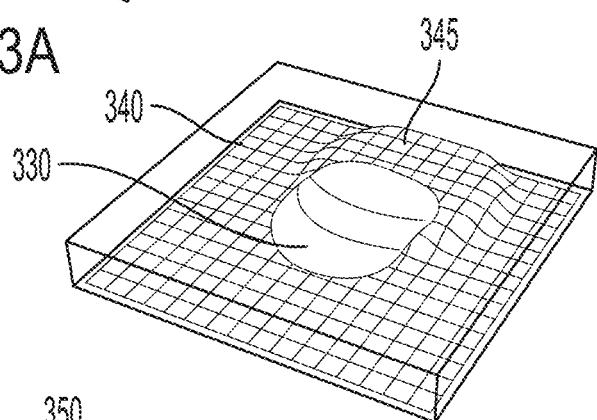
Figure 3C:
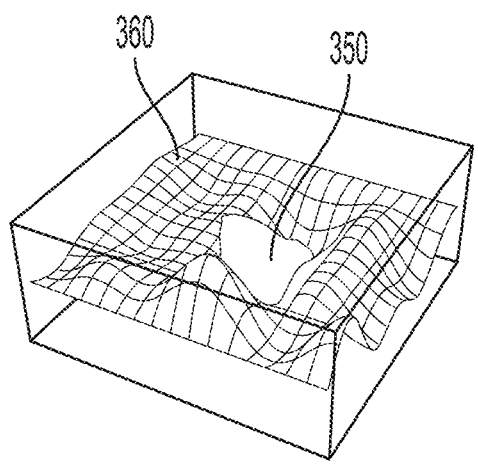

According to embodiments described herein, two free adjustable parameters: namely gravitational constant and droplet contact angle are used. By adjusting these parameters, it can be ensured that the steady state shape of the droplet on the flat surface matches the shape observed via real experiments. Training an ANN may involve using a large representative training data set. Here, three sets of training data sets representing various types of substrate geometry were generated. Each training set has about 10,000 data points. Examples of the droplet shape 310, 330, 350 from each training set are shown in FIGS. 3A-3C. The three training data sets differ primarily in the nature of the substrate geometry. FIGS. 3A, 3B, and 3C show examples of the first set, second set, and third set, respectively. In the first set, the substrate geometry 320 is a slightly curved surface. In the second set, the substrate geometry 340 includes a step-like surface having one or more step features 345. The third set includes substrate geometries 360 having highly curved surfaces.

To generate a random surface for the first set, the substrate geometry can be represented as a linear combination of harmonic basis functions, among other techniques to represent curved surfaces such as spline surfaces with control points, patched surfaces, subdivision surfaces etc. For every such surface, the steady-state droplet shape is calculated. The height field of the deposition surface is then exported in addition to the droplet height as measured from the deposition surface (i.e. offset from the deposition surface) into files. The geometry of the deposition surface is the input to the network and droplet height (i.e. offset) is the output from the network. Each input and output is an image, for example.

Figure 4A:
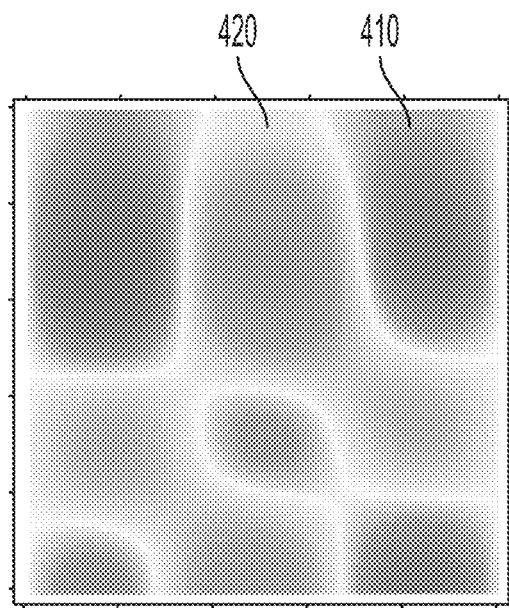
FIGS. 4A-4F show example representative outputs from the three training sets in accordance with embodiments described herein.
Figure 4B:
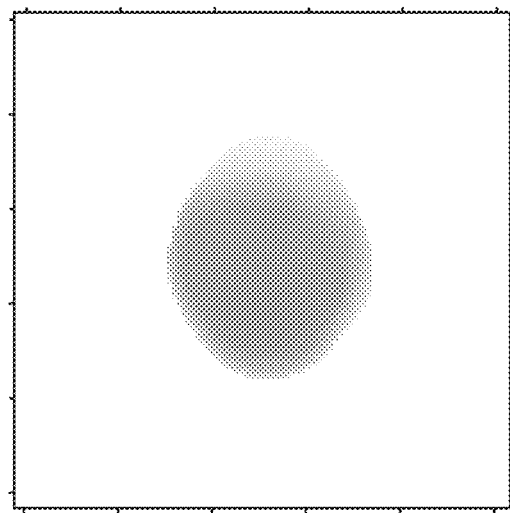
Figure 4C:
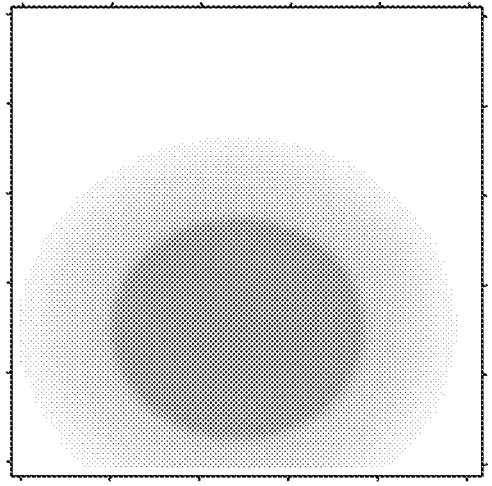
Figure 4D:
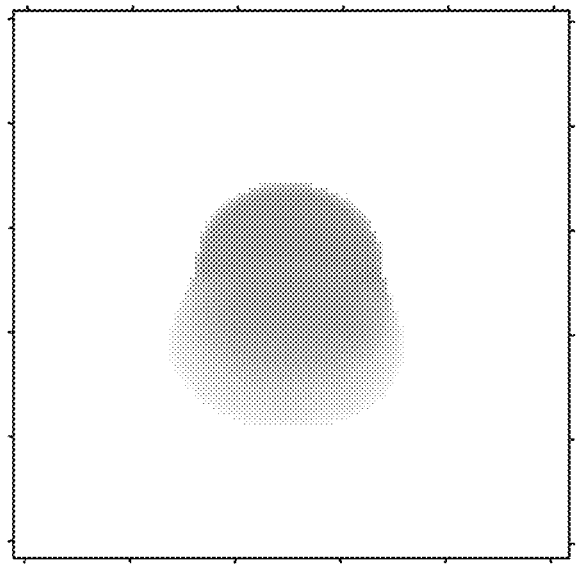
Figure 4E:
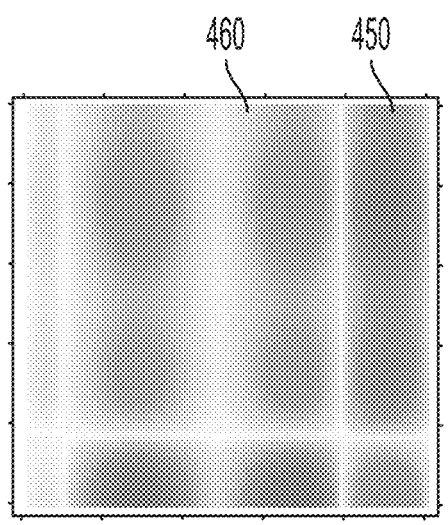
Figure 4F:
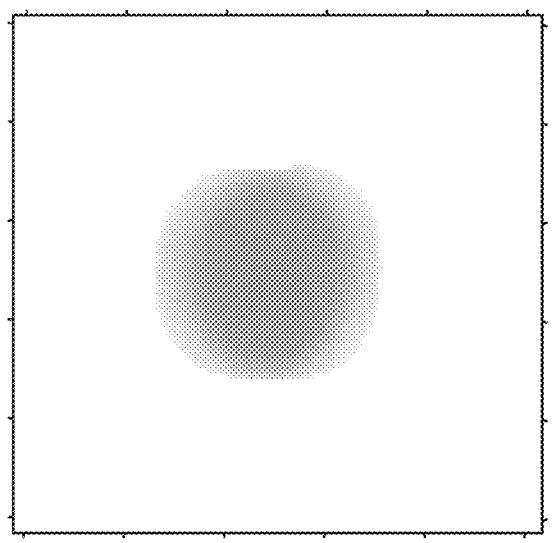

The examples from the training set are shown in FIGS. 4A-4F. FIG. 4A shows an example substrate geometry represented as a height field. In this example, first sections 410 are further away than second sections 420. While two different sections are shown, it is to be understood that there is a spectrum of heights represented in the height field. FIGS. 4B-4D show example solidified droplets. Similarly, FIG. 4E illustrates another example substrate geometry represented as a height field. In this example, First sections 450 are further away than second sections 460. FIG. 4F shows an example solidified droplet.

Figure 5A:
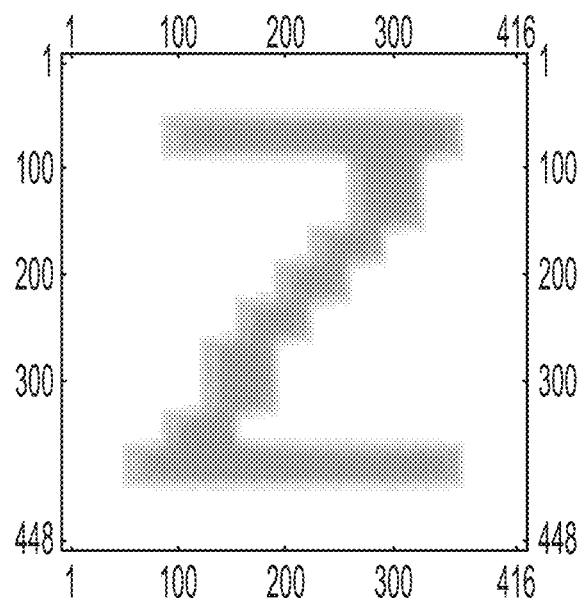
FIGS. 5A and 5B show an examples of an estimated height fields of a shape in accordance with embodiments described herein.
Figure 5B:
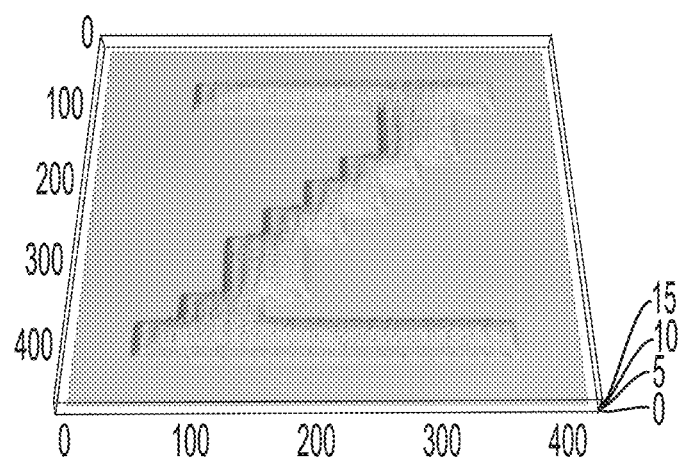

After training the neural network, the printing of a part can be estimated by iteratively placing droplets along the path (as determined by the G-Code) slice by slice. Therefore, an output representing an estimated shape is produced. FIGS. 5A and 5B show an examples of an estimated height fields of a shape in accordance with embodiments described herein.

Uncertainties in any manufacturing process lead to deviations between nominal designs and their fabricated counterparts. Nominally designed shape and material layout is invariably altered in an AM process, and shape variations can lead to undesirable effects such as (unintentional) porosity and surface roughness. These in turn can lead to long-term performance degradation due to residual stresses, fatigue failure mechanisms such as crack initiation, or can negatively affect bulk mechanical properties. Metal parts designed for high stress applications should be fully dense with smooth surfaces to minimize the possibility of failure in service. While such properties are achievable in machining, the geometric complexity achievable using AM enables manufacturing functional high performance lightweight parts that may be impossible to fabricate otherwise. This feature of metal AM motivates the desire to understand the relationship between a nominal design and its corresponding variational class of shapes arising due to the combination of chosen AM process parameters and manufacturing error. Although embodiments described herein are directed to select metal AM processes, it can be observed that similar issues arise in polymer AM as well.

The intricate relationship between AM process parameters and fabricated part properties has received significant attention, mostly by fabricating parts and either studying their microstructure or by mechanical testing to determine (anisotropic) material properties. For metal AM, microstructural details such as grain morphology, grain texture, and phase identification for Powder Bed Fusion and Direct Energy Deposition processes are studied using LOM and SEM microstructure imaging. The orientation of the columnar grains seen in these processes are highly influenced by a combination of the scan strategy and applied energy to induce material phase changes key to the AM process. Experimental analysis to map process parameters to particular manufacturing-driven structural and material variation is done in a case-by-case manner for each material and process combination in metal AM processes. Due to the availability of several AM technologies, applications, and testing strategies, a rich body of literature exists for AM metallurgy and processing science.

AM is not a stand-alone process and is typically followed by heat treatment to relieve residual stress and/or improve mechanical performance, and by machining to improve part surface quality and/or remove support materials. Applications using post-processing may plan the post-processing operations, such as support material removal or finishing rough part surfaces. Equipment manufacturers are concerned with geometric properties such as the minimum feature size/resolution, surface roughness, and accuracy to ensure the overall fabricated shape (excluding support materials) is as close as possible to the nominal design. Therefore, estimating the fabricated shape corresponding to a nominal design may be done as a function of AM process parameters, so that important properties such as porosity, roughness, and geometric deviation from nominal design can be characterized before fabrication. Very little attention has been directed towards computational modeling and representation of as-manufactured part shape. Effective shape modeling of as-manufactured part shape will help AM process planning by eliminating expensive trial-and-error due to multiple builds, and converge quickly to parameter values that yield acceptable part quality.

Figure 6A:
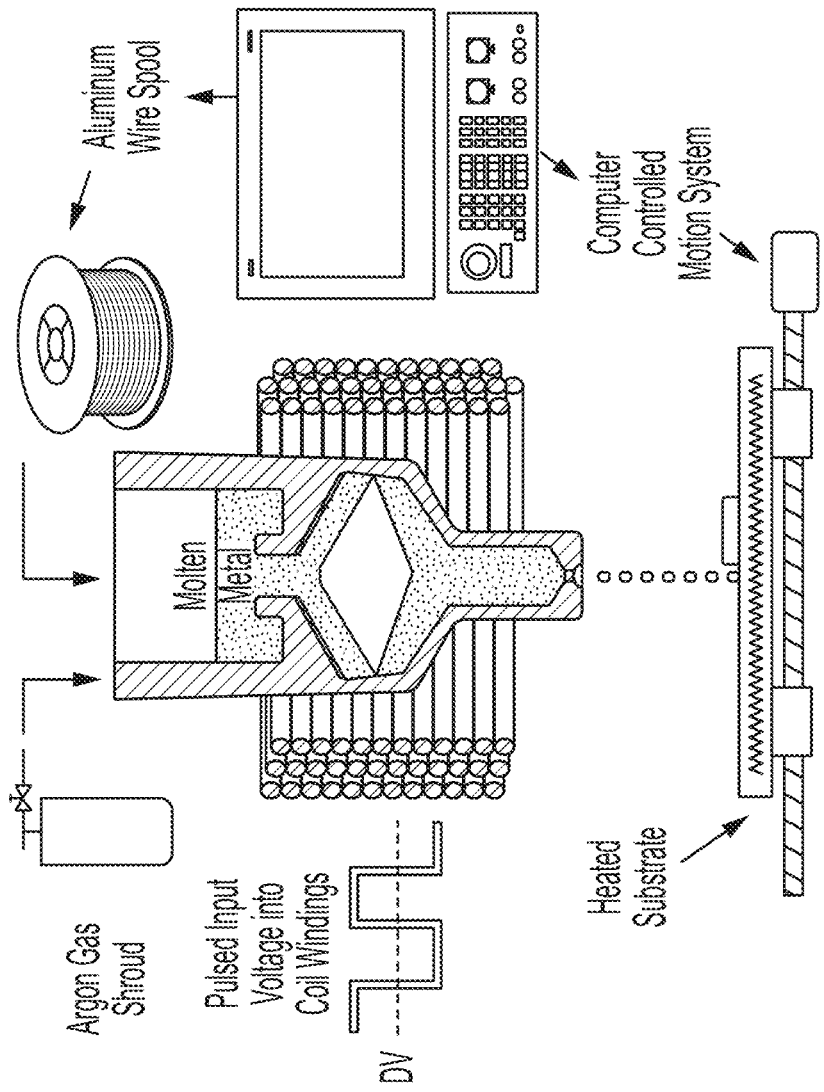
FIG. 6A shows an example drop-on-demand magnetohydrodynamic (MHD) deposition system in accordance with embodiments described herein.

Embodiments described herein illustrate an approach to efficiently estimate as manufactured shape as a function of AM process parameters while considering manufacturing uncertainty. The approach uses classical ideas of predictive estimation with uncertainty quantification. Experimental data is first assimilated in the form of scanned prints of simple shapes for a fixed set of process parameters. The input uncertainties associated with local material deposition are quantified. This is done by solving an inverse problem to estimate parameters of a probability kernel whose convolution with the tool-path used to build the scanned parts yields the best representation of the family of scanned shapes. This inverse problem is solved in two stages. First the family of scanned shapes are mapped to a unparameterized representation of the kernel by solving an iterative deconvolution algorithm. A good initial condition for the iterative algorithm is obtained by solving a multi-physics problem that captures the AM physical phenomena at the smallest manufacturing scale (i.e. the scale of the minimum feature size). The unparameterized field resulting from the deconvolution approximates the spatial probability of material deposition (coupled with measurement error) for the smallest manufacturable feature. This field is then parameterized in terms of a known spatially varying function (e.g. a Gaussian distribution) considered as the probability kernel. Solving for the kernel parameters that best approximate the unparameterized field results in a mapping from the fixed AM process parameters to the kernel parameters. Repeating this process for several experiments by varying the process parameters produces a data-set that is fed into a neural network that learns the mapping from AM process parameters to kernel parameters. Thus, given a set of AM process parameters the kernel parameters that capture the uncertainty in local material deposition can rapidly be estimated. Embodiments described herein may use a drop-on-demand magnetohydrodynamic (MHD) deposition system shown in FIG. 6A to illustrate the computational approach. It is to be understood that other types of printing processes and/or systems may be used.

Figure 6B:
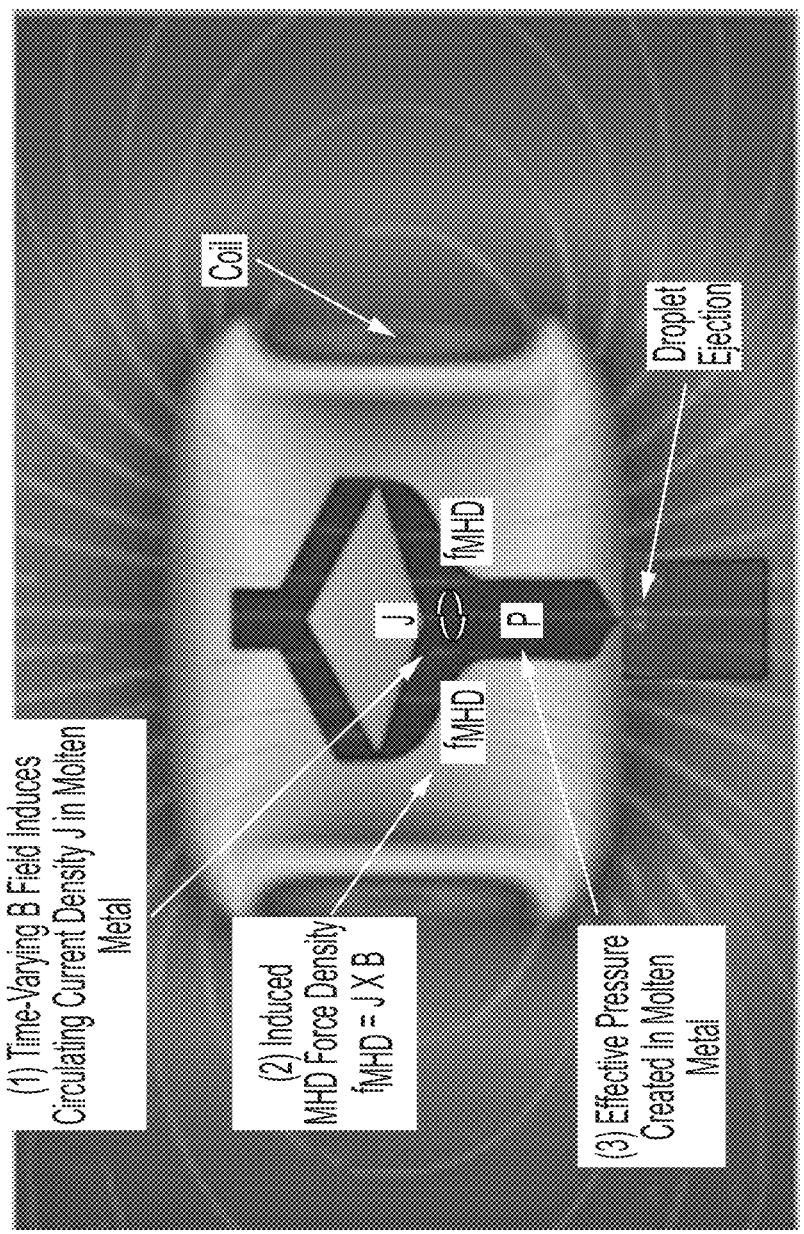
FIG. 6B shows a simulation model showing the magnetic field generated by the pulsed magnetic coil as well as the volume fraction of ejected liquid aluminum in accordance with embodiments described herein.

In the MHD method, a spooled solid metal wire (e.g., aluminum wire) 610 is fed continuously into a ceramic heating chamber 620 of a magnetohydrodynamic printhead and resistively melted to form a reservoir of liquid metal that feeds an ejection chamber via a capillary force. A coil 625 at least partially surrounds the ejection chamber and is electrically pulsed 640 to produce a transient magnetic field that permeates the liquid metal and induces a closed loop transient electric field within it. The electric field gives rise to a circulating current density that back-couples to the transient magnetic field and creates a magnetohydrodynamic Lorentz force density within the chamber. The radial component of this force creates a pressure that acts to eject a liquid metal droplet out of the nozzle orifice. Ejected droplets travel to a substrate 650 where they coalesce and solidify to form extended solid structures. Three-dimensional structures are printed layer-by-layer using a moving substrate 650 controlled by a controller that enables precise pattern deposition. FIG. 6B shows a simulation model showing the magnetic field generated by the pulsed magnetic coil as well as the volume fraction of ejected liquid aluminum.

Embodiments described herein involve a way to construct the as-manufactured part shape by solving the forward problem of tracing the material accumulation along a specified deposition pattern (or tool-path). Solving this well-posed problem involves a local estimation of the material accumulated at each location along the deposition pattern. Therefore, the physics of local material accumulation is be solved at the smallest manufacturing scale, i.e. the scale of the minimum printable feature. For the drop-on-demand MHD system, estimation of local material accumulation involves modeling the multi-physics problem that captures droplet coalescence. The minimum printable feature is a solidified droplet whose shape is dependent on a combination of process parameters, namely the droplet temperature, deposition frequency, the shape of the substrate on which deposition occurs (as layers build up, surface roughness and curvature will influence coalescence), the deposition pattern, and manufacturing uncertainty.

A process for estimating an as manufactured shape while considering manufacturing uncertainty is described in accordance with embodiments described herein. A plurality of scanned prints of a product part and a scan path is received. According to various implementations, the part is printed using a magnetohydrodynamic deposition system. According to embodiments described herein, the part comprises a plurality of minimum printable features deposited along the scan path. A shape of a minimum printable feature of the product part is determined by analyzing the respective prints in a scan path representation. In some cases, the shape of the minimum printable feature is determined by statistically analyzing the respective prints in the scan path representation. According to various embodiments, the minimum printable feature comprises a droplet after it has solidified on a substrate. The shape of the minimum printable feature may comprise a height of the minimum printable feature after it has solidified on a substrate.

A manufacturing error of the minimum printable feature, that is dependent on the combination of process parameters including the substrate shape as discussed above, is determined based on the statistical analysis. According to various implementations, determining the manufacturing error of the shape of the minimum printable feature comprises determining the manufacturing error of the shape of the minimal printable feature using estimated shapes of the minimum printable features on a plurality of randomly generated surfaces. In some cases, determining the manufacturing error of the minimum printable feature comprises determining the manufacturing error of the minimum printable feature using a multivariate Gaussian.

A manufacturing error of a shape of the part is determined based on the determined manufacturing error of the minimum printable feature. According to various implementations, the manufacturing error of the shape of the part comprises sweeping the minimum printable feature with the scan path. According to various embodiments described herein determining manufacturing error of the shape of a part, and the estimated manufactured shape comprises assuming that the plurality of minimum printable features the same shape at every location. An estimated manufactured shape of the part is produced based on the determined manufacturing error of the part.

According to various embodiments, first the forward problem is solved without considering manufacturing uncertainty and present a multi-physics model for droplet coalescence on curved surfaces. The solution to this multi-physics problem may involve significant computational resources and will be impractical to solve on a drop-by-drop basis for practical parts manufacturing. However, solving this numerical problem offline for several combinations of process parameter values helps build a training set that can be used to construct a surrogate model for the discretized PDE solver, while considering manufacturing uncertainty. For the drop-on-demand MHD system, local material accumulation on a surface with Gaussian curvature $\kappa$ is modeled by solving the system of coupled multiphase incompressible Navier-Stokes and heat transfer equations, $$\nabla \cdot u_i = 0, \quad (1)$$

$$\frac{\partial u_i}{\partial r} + (u_i \cdot \nabla)u_i - v_i \nabla^2 u_i = -\nabla p + g + f_\sigma + D(T)u_i,$$

$$f_\sigma = \sigma \kappa \nabla \alpha,$$

$$\frac{\partial u_i}{\partial t} = \Delta T_i$$

Figure 7:
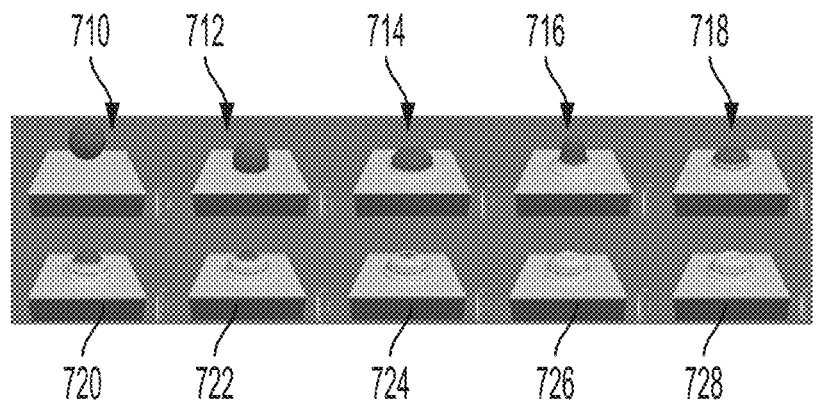
FIG. 7 shows the solid fraction of the droplet on the substrate surface at different times in accordance with embodiments described herein.
Figure 8:
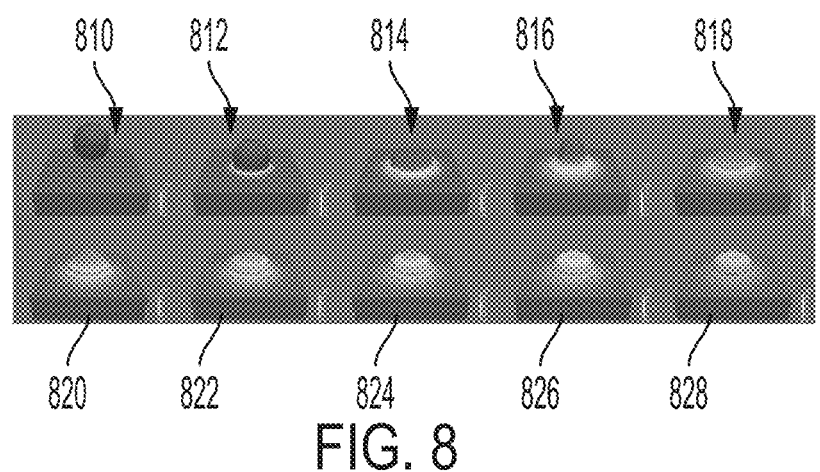
FIG. 8 illustrates a temperature map of the solidifying droplet that shows a gradual cooling of the droplet and heat transfer to the substrate at different times in accordance with embodiments described herein.

Here, the subscript i denotes the phase, for example, liquid or gaseous, t is the time, $u_i$ is the velocity vector, $v_i$ is the kinematic viscosity, p is the pressure, g gravitation constant, $f_\sigma$ is the force which models surface tension, D(T) is Darcy's term which models the phase transition, $\sigma$ is the surface tension constant, $\kappa$ is the curvature of the boundary between phases and $T_i$ is the temperature. Time steps of 1 ms are used to obtain the intermediate droplet solidification and temperature profiles. FIG. 7 shows the solid fraction of the droplet on the substrate surface at different times. Time step 710 shows the completely liquid droplet before it is on the substrate. Time steps 712, 714, 716, 718, 720, 722, 724, 726 show the droplet at various stages of solidifying and time step 728 shows the droplet completely solidified on the substrate. Similarly, FIG. 8 illustrates a temperature map of the solidifying droplet that shows a gradual cooling of the droplet and heat transfer to the substrate at different times. Time step 810 shows the completely liquid droplet before it is on the substrate. Time steps 812, 814, 816, 818, 820, 822, 824, 826 show the droplet at various stages of solidifying and time step 828 shows the droplet completely solidified on the substrate.

Figure 9:
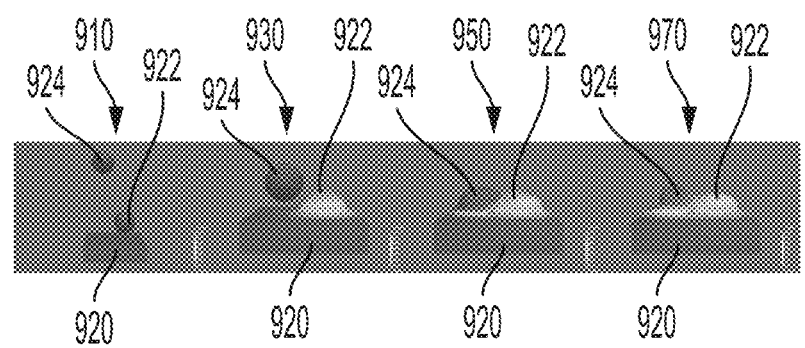
FIG. 9 illustrates a temperature map of two droplets in accordance with embodiments described herein.

While FIGS. 7 and 8 show simulations are conducted for the case of a single droplet falling on a flat surface, it is to be understood that embodiments described herein could be used to determine a solidified shape of multiple droplets on a surface. When multiple droplets are deposited and simultaneously solidifying, the curvature and temperature of previously deposited and solidifying droplets affect the as-manufactured shape. Droplet coalescence is shown in FIG. 9 where the coupled evolving temperature profile can be seen. At time step 910, a first droplet 922 and a second droplet 924 have yet to reach the substrate 920. At time step 930, the first droplet 922 has made contact with the substrate 920 and has started to cool and solidify while droplet 924 has not reached the substrate yet. At time step 950, both the first droplet 922 and the second droplet 924 have reached the surface of the substrate 920 are starting to solidify. Finally, time step 970 shows a later time step than that of 950 with both the first droplet 922 and the second droplet 924 have reached the surface of the substrate 920 are starting to solidify. It can be observed that the first droplet 922 is further along in the solidification to process because it was deposited before the second droplet 924. Each time step simulation takes around one hour to complete. Thus, the simulation of as-manufactured part shape using fully coupled numerical methods will not scale to realistic parts.

Embodiments described herein involve a way to characterize the uncertainty in the manufacturing process at the smallest manufacturing scale (i.e. the droplet scale). To do this, a training set is built by running simulations for droplet deposition on a randomly generated surface with varying Gaussian curvature. It is important to capture the droplet solidification on curved surfaces because the final part surface roughness and porosity is directly influenced by the accumulated buildup of material on previously solidified layers (which cannot be considered as a flat substrate).

Figure 10:
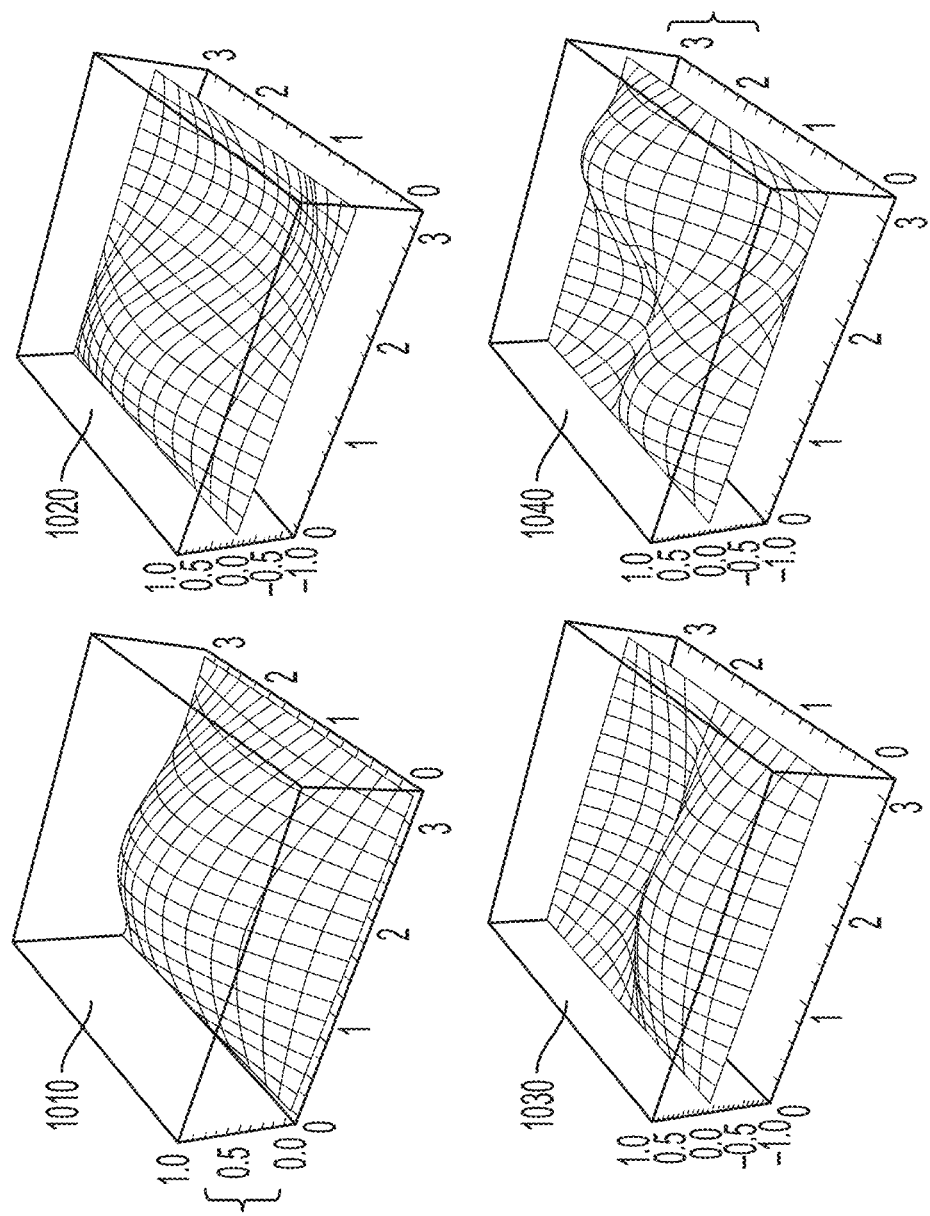
FIG. 10 shows the first four Laplacian eigenfunctions on a square domain with homogeneous Dirichlet boundary conditions visualized as a surface in 3d in accordance to with embodiments described herein.

Embodiments described herein involve generating a random surface using a linear combination of six basis functions, where each basis function is an eigenfunction of the (2D) Laplace operator in a square domain with homogeneous Dirichlet boundary conditions, and the linear coefficients are random values. The Laplacian eigenfunctions in this simple case are trigonometric function of two variables. FIG. 10 shows the first four 1010, 1020, 1030, 1040 Laplacian eigenfunctions on a square domain with homogeneous Dirichlet boundary conditions visualized as a surface in 3d. Weighted sums of the eigenfunctions are represented as surfaces embedded in R3. Many other approaches to generate random curved surfaces are possible.

Figure 11:
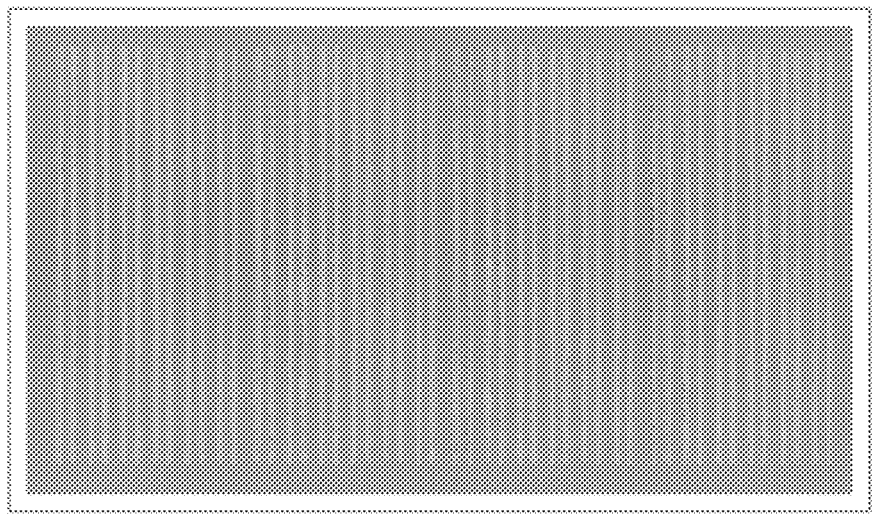
FIG. 11 shows an image of the top view of a set of lines printed by a 3d printer in accordance with embodiments described herein.
Figure 12A:
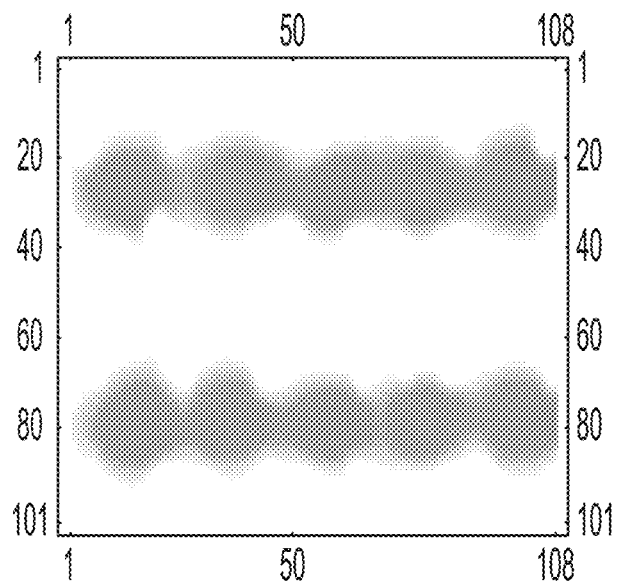
FIG. 12A illustrates an 2D array output of the height field in accordance with embodiments described herein.
Figure 12B:
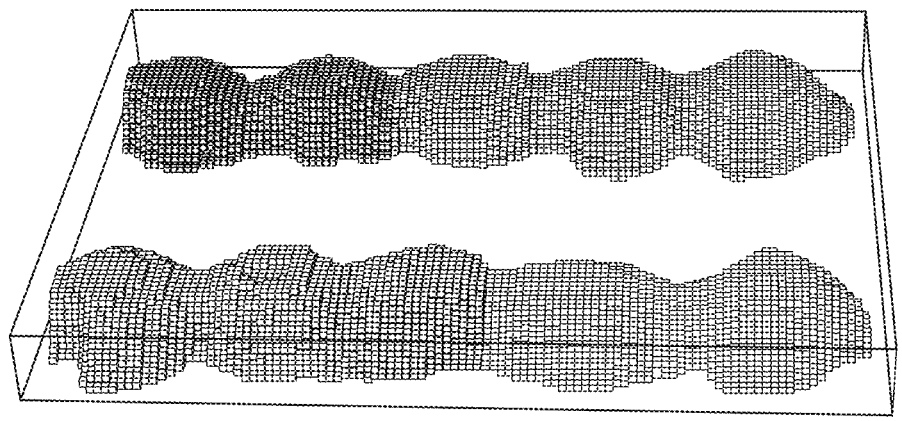
FIG. 12B shows a voxelized representation of a single droplet in accordance with embodiments described herein.
Figure 13:
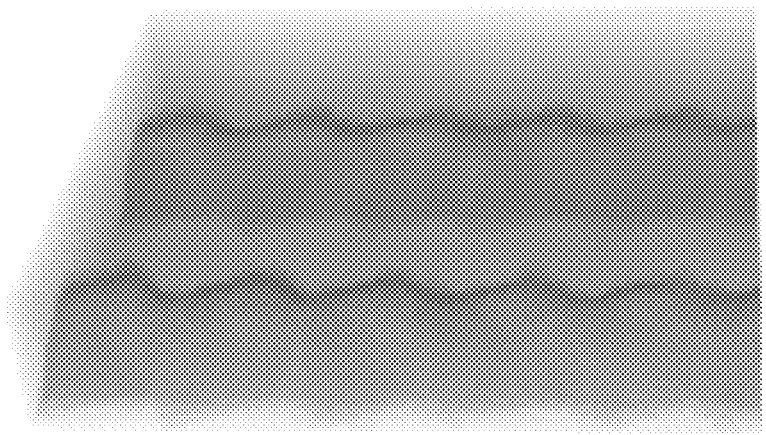
FIG. 13 illustrates a volumetric plot of the voxels probabilities where the color intensity corresponds to the probability in accordance with embodiments described herein.

In addition to the substrate Gaussian curvature $\kappa$ at the deposition point, the droplet temperature, Td and the substrate temperature, Ts are considered as the key process parameters driving the droplet shape. The solidified droplet shape can be non-trivial, and simulation times can take around one hour of compute time for grid sizes of 1283. The output of each simulation at the final time step is the solidified droplet represented as a binary-valued (indicator function) on a three-dimensional grid, but it is highly unlikely that the printed droplet will have exactly the same shape as the simulated droplet. This is due to manufacturing and material accumulation error. To model this error, several droplets are printed at distinct (nonoverlapping) locations for fixed values to of $T_d$, $T_s$, $\kappa$ using the MHD process. These dissimilar shapes are individually scanned using a Kaysen surface scanner that has a scanning resolution of 20 µm in each spatial direction. FIG. 11 shows an image of the top view of a set of lines printed by a 3d printer. The image is acquired by the Kaysen scanner. The color coding indicates the height of the scanned pixel relative to the camera position. FIG. 12A shows a similar image as FIG. 11, but shows a close-up at one of the paths. The output from the scanner is a 2D array of the height field as shown in FIG. 12A, which is an image storing the height values between the scanner position and points on the printed part at sample points in the scanning plane. Assuming the droplet shape does not have undercuts, this height map is sufficient to reconstruct a 3d representation of the manufactured droplet $P_m(T_d, T_s, \kappa)$ as an indicator function. An example of the voxelized representation of a single droplet is shown in FIG. 12B. Finally, the probability that a voxel is filled with the material is calculated by taking the average value of all $P^m(T_d, T_s, \kappa)$. The resulting volumetric plot of the voxels probabilities is shown in FIG. 13 where the color intensity corresponds to the probability.

$$P(T_d, T_s, \kappa) = \frac{1}{N} \sum_{m=1}^{N} P^m(T_d, T_s, \kappa)$$

It is noted that in practice it is extremely difficult to obtain scanned data for arbitrarily varying substrate curvatures (i.e. previously solidified droplets). The measurement of the surface curvature has to be done at the droplet length scale, which may be feasible with the 20 µm resolution scanner, but it is extremely challenging to ensure the droplet is deposited with such precision that it lands on the previously solidified droplet at a region of expected curvature. Therefore, $\kappa=0$ is fixed (i.e. a flat substrate) to obtain $P(T_d, T_s, 0)$.

Thus, a variation of the classical image restoration problem is observed; a nominal shape $N(T_d, T_s, \kappa)$ of the droplet can be computed using a multi-physics PDE solver and an averaged ('blurred') estimate of the printed droplet can be experimentally obtained for a fixed set of process parameters. Assuming the uncertainty in droplet deposition is modeled as a probability kernel D:

$$P(T_d, T_s, 0) = D(T_d, T_s, \kappa) \otimes N(T_d, T_s, \kappa) \quad (3)$$

Observe that the kernel $D(T_d, T_s, \kappa)$ approximates the probability of droplet solidification on a curved surface using data gathered for droplet solidification on a flat surface; therefore the kernel parameters for non-flat substrates will always be less accurate than the parameters for flat surfaces.

The error $D(T_d, T_s, \kappa)$ in local material deposition (the analog of the PSF in image restoration) for a given set of process parameters can be computed using the classical iterative Richardson-Lucy (RL) deconvolution algorithm.

---

Algorithm 1 Richardson-Lucy (RL) deconvolution

Require: $\mathcal{P}, \mathcal{T}$
Initialize $\mathcal{K}^{(0)}$
Define: $\mathcal{T}_r$ = RotateLeft $[\mathcal{T}, \{N_x/2, N_y/2\}]$
repeat $$\mathcal{K}^{(l+1)} = \mathcal{K}^{(l)} F^{-1}\left[ F\left[ \frac{\mathcal{P}}{F^{-1}[F[\mathcal{K}^{(l)}]F[\mathcal{T}_r]]} \right] F[\mathcal{T}_r] \right]$$

until $\Sigma$ Flatten $[\mathcal{K}^{(l+1)} - \mathcal{K}^{(l)} | \mathcal{K}^{(l)}] < \delta$
Ensure $\mathcal{K}$

---

The output of the RL deconvolution algorithm is an unparameterized probability kernel sampled on a grid size equal to the PDE solver resolution. The manufacturing uncertainty may be represented using a small number of parameters; the 1283 parameters in the binary volume representing the droplet shape are fitted onto a multivariate Gaussian function, $$G(x, y, z; \sigma_x^2, \sigma_y^2, \sigma_z^2) = \frac{1}{(2\pi)^{3/2} \sigma_x \sigma_y \sigma_z} \exp\left(-\frac{1}{2}\left(\frac{x^2}{\sigma_x^2} + \frac{y^2}{\sigma_y^2} + \frac{z^2}{\sigma_{xz}^2}\right)\right)$$

Figure 14:
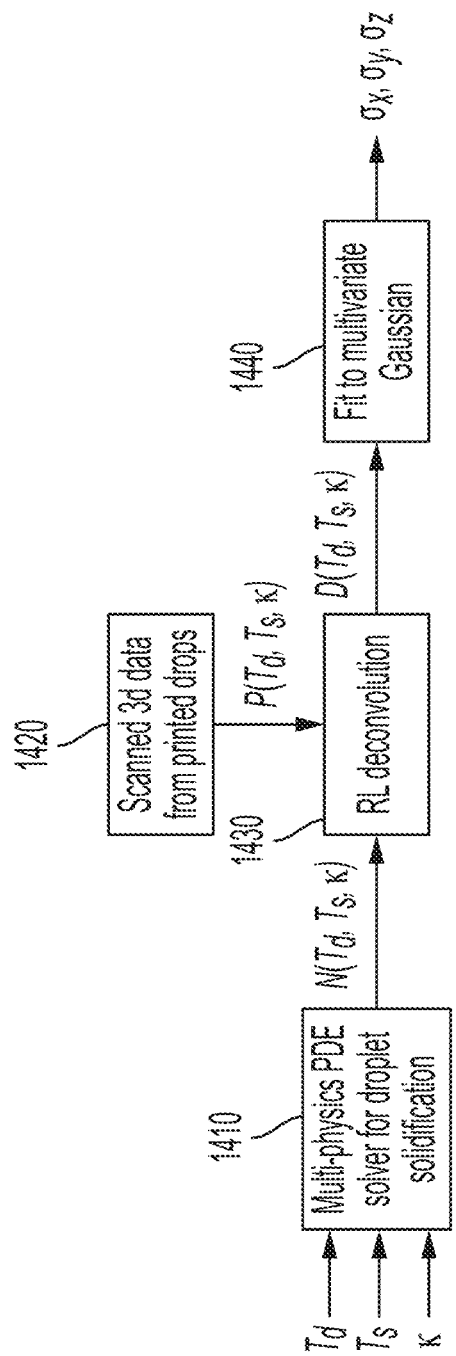
FIG. 14 shows a surrogate model for computations using a neural net in accordance with embodiments described herein.

Here, $\sigma_x, \sigma_y, \sigma_z$ are standard deviations estimated by minimizing the norm between the gaussian function and $D(T_d, T_s, \kappa)$. A map between the process parameters and the kernel parameters ($\{T_d, T_s, \kappa\{\sigma_x, \sigma_y, \sigma_z\}$) using a fully connected neural network with hyperbolic tangent activation functions is established. FIG. 14 shows a surrogate model for computations discussed herein using a neural net. An RL deconvolution process is performed using scanned 3d data from printed droplets 1420 and a multi-physics solver for droplet solidification 1410. The solver 1410 takes for input $T_d$, $T_s$, and $\kappa$. The uncertainty of droplet solidification is approximated as a multivariate Gaussian 1440. The network has an input layer, five hidden layers and an output layer. To train the network, droplet shapes are computed by running the multiphysics simulation for a single droplet and for fixed values of $\{T_d, T_s, \kappa\}$ The output of each simulation at the final time step is the solidified droplet represented as a binary-valued (indicator function) on a three-dimensional grid, which is used as the nominal shape $N(T_d, T_s,$ The uncertainty of droplet solidification is approximated as a multivariate Gaussian). A representation of $P(T_d, T_s, \kappa)$ is then computed using data collected for the fixed set of process parameters. Equation 3, using the RL-deconvolution, is then solved to estimate $D(T_d, T_s, \kappa)$ which is then fit using the Gaussian function. The process parameters are then varied and the training data generation is repeated for each instantiated set of parameters to create a large training set, and increase the accuracy of the neural-net.

According to embodiments described herein, the most accurate representation of multi-drop coalescence would be obtained while considering simultaneous solidification of overlapping and cooling droplets. It is possible to model this scenario by including the frequency and spacing of droplet deposition into the multiphysics model, but this type of model may involve exponentially more compute time depending on the number of solidifying droplets considered. Therefore, in the interest of generating enough training data for the neural network within a reasonable time frame, it is assumed that liquid droplets are always deposited on either previously solidified droplets or on the flat substrate. However, it is noted that in principle the same idea presented in this section can be extended to build a surrogate model for multiple droplet coalescence while considering deposition frequency as an additional parameter. In practice the computational time that is involved to build a training set for such a surrogate model may be prohibitively large.

Variations between the as-designed and as-manufactured shape occur because of the cascading error as the droplet is deposited along a scan path. The uncertainty of droplet solidification is approximated as a multivariate Gaussian. The mapping between input process parameters Td, Ts, $\kappa$ and the parameters of the Gaussian function are learned. The representation of uncertainty is used at the droplet scale to estimate the accumulated uncertainty at the part scale. A collection of parts are printed corresponding to a nominal design H* while fixing the process parameters Td, Ts and a scalar probability field H(Td, Ts) is constructed whose value at a spatial location indicates the probability of material deposited at that location. The formalism of Equation 3 is used again to model uncertainty at the part scale.

$$H(T_d, T_s) = K(T_d, T_s) \otimes M(T_d, T_s) \quad (5)$$

Figure 15:
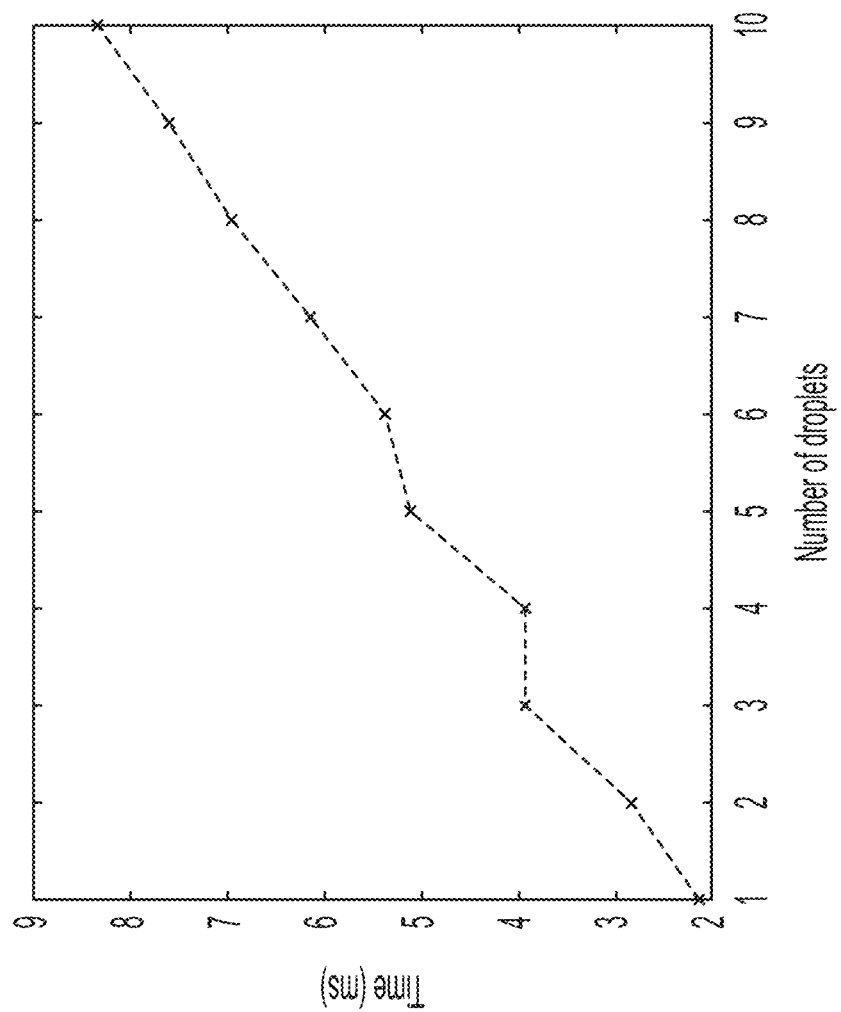
FIG. 15 shows a plot of time versus the number of droplets in accordance with embodiments described herein.

The field $M(T_d, T_s)$ represents an approximation of the as-built geometry while considering droplet coalescence along the tool path. To compute this field, it is observed that in principle one may invoke the surrogate model recursively by setting $\kappa$ to be the curvature at the previously solidified droplet. Even with the assumption that droplets solidify only on previously solidified droplets or on the flat substrate, recursively invoking the machine learning model to approximate the shape for millions of droplets will take substantial time (approximately 16 minutes for a million droplets). In a simple experiment the time to compute the as-manufactured shape is estimated by invoking the neural-network for each droplet, and then taking a level set of the resulting probability field to represent expected droplet shapes with high likelihood. FIG. 15 shows that the time is roughly linear with the number of invocations of the neural net.

To compute the as-manufactured shape rapidly without invoking a solver for each droplet's solidification, the assumption is made that the uncertainty at the droplet scale is shift-invariant, i.e. the uncertainty is not dependent on the position at which an individual droplet is deposited. This is a reasonable assumption to make because the material phase-changes and manufacturing uncertainties are not position dependent. Notice that the same assumption is made in image restoration to model the point-spread function. With this assumption, it is now observed that the field $M(T_d, T_s)$ can be modeled as the convolution $$M(T_d,T_s)=G(\sigma_x^2\sigma_y^2\sigma_z^2)\otimes T$$

Here, $G(\sigma_x^2\sigma_y^2\sigma_z^2)$ represents the droplet scale uncertainty parameterized as a Gaussian function for a specified set of process parameters $T_d$, $T_s$, $\kappa$. In practice it is assumed that $\kappa=0$. Now the field $M(T_d, T_s)$ can be calculated rapidly using the convolution theorem and implementing the convolution in frequency domain. Rapid parallel algorithms to compute Fourier transforms are used to quickly estimate $M(T_d, T_s)$. Our model for M(Td, Ts) is independent of the scan path T used to build the part although in practice the scan path can also be a source of deviation between the as-designed and as-manufactured parts. To include the scan path into the formulation of $M(T_d, T_s)$ we can (similar to the droplet uncertainty estimation) print several distinct plans (i.e. distinct scan paths) of the same nominal design H*, and average the resulting convolutions $$M(T_d, T_s) = \frac{1}{N}\sum_{i=1}^{n} G(\sigma_x^2\sigma_y^2\sigma_Z^2) \otimes T_i \tag{7}$$

Observing that $G(\sigma_x^2\sigma_y^2\sigma_z^2)$ does not change within the sum, and using the property that convolution distributes over addition:

$$M(T_d, T_s) = \frac{1}{N}G(\sigma_x^2\sigma_y^2\sigma_Z^2) \otimes \sum_{i=1}^{m} T_i \tag{8}$$

Thus, the calculation of several convolutions can be reduced into a single convolution over a sum of scan paths. Given voxel representations of the scan paths, the sum can be computed pointwise and in parallel. Now, suppose we have a description of $H(T_d, T_s)$ $$H(T_d, T_s) = \frac{1}{N}\sum_{i=1}^{n}H^m(T_d, T_s) \tag{9}$$

obtained by printing several specimens $H_m(T_d, T_s)$ with fixed process parameters $T_d$, $T_s$, a representation of the family of parts printed is represented using the same process plan, as a probability field. Thus, the unknown kernel K ($T_d$, $T_s$) can be solved by once again using the RL-deconvolution algorithm to estimate part level uncertainty. Manufacturing error at the part scale is obtained by deconvolving (averaged) scanned prints of a calibration part with a nominal representation generated by convolving droplet-scale uncertainty with scan path(s) representing plans to print the calibration part.

Once K (Td, Ts) and $G(\sigma_x^2\sigma_y^2\sigma_z^2)$ are determined, the representation of the as-manufactured part for a given scan path T given process parameters $T_d$, $T_s$ can be written as:

$$H(T_d,T_s)=K(T_d,T_s)\otimes(G(\sigma_x^2\sigma_y^2\sigma_z^2)\otimes T) \tag{10}$$

By associativity, this is equivalent to $$H(T_d,T_s)=(K(T_d,T_s)\otimes G(\sigma_x^2\sigma_y^2\sigma_z^2))\otimes T \tag{11}$$

Writing K $(T_d, T_s)\otimes G(\sigma_x^2\sigma_y^2\sigma_z^2)$ as X $(T_d, T_s)$ (because the Gaussian function parameters are directly related to $T_d$, $T_s$):

$$H(T_d,T_s)=K(T_d,T_s)\otimes T \tag{12}$$

Equation 12 is used to model the as-manufactured shape corresponding to a scan path and given process parameters. The convolution theorem is used to implement Equation 16 as $$H(T_d,T_s)=F^{-1}(F(X(T_d,T_s))\cdot F(T)) \tag{13}$$

Figure 16A:
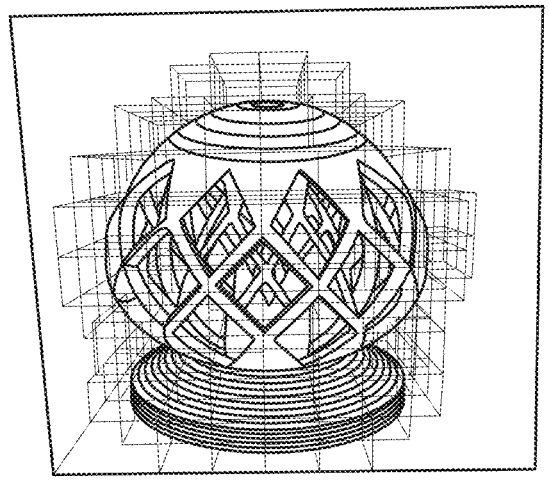
FIGS. 16A-16C illustrate representations of the as-manufactured shapes in accordance with embodiments described herein.
Figure 16B:
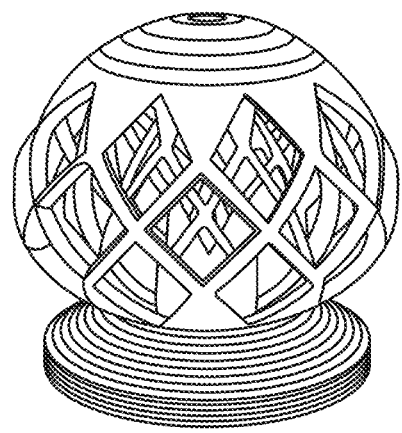
Figure 16C:
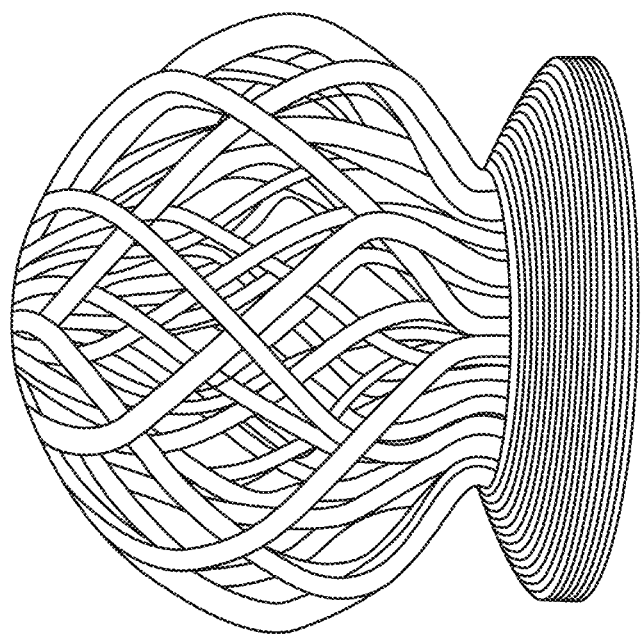

Here, · represents pointwise multiplication. This results in accurate representations of the as-manufactured shapes as shown in FIGS. 16A-16C.

Figure 17:
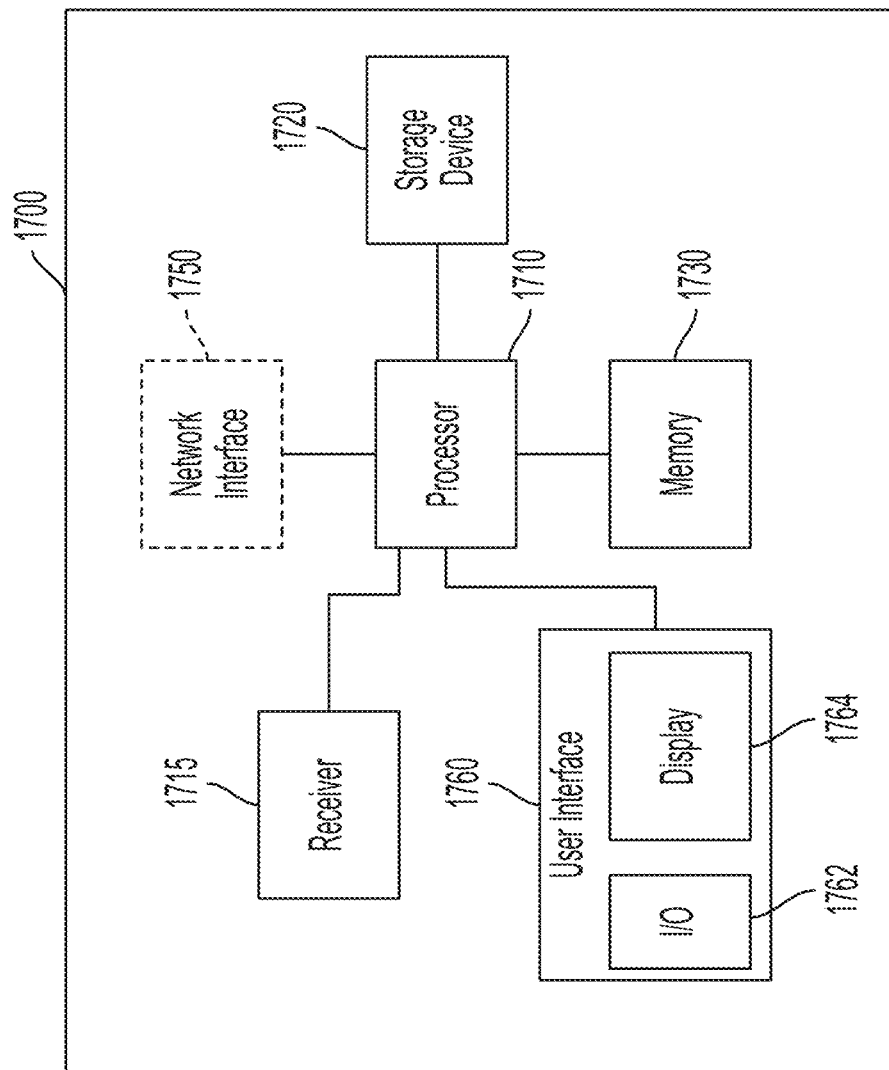
FIG. 17 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 17. Computer 1700 contains a processor 1710, which controls the overall operation of the computer 1700 by executing computer program instructions which define such operation. It is to be understood that the processor 1710 can include any type of device capable of executing instructions. For example, the processor 1710 may include one or more of a central processing unit (CPU), a graphical processing unit (GPU), a field-programmable gate array (FPGA), and an application-specific integrated circuit (ASIC). The computer program instructions may be stored in a storage device 1720 (e.g., magnetic disk) and loaded into memory 1730 when execution of the computer program instructions is desired. Thus, the steps of the methods described herein may be defined by the computer program instructions stored in the memory 1730 and controlled by the processor 1710 executing the computer program instructions. The computer 1700 may include one or more network interfaces 1750 for communicating with other devices via a network. The computer 1700 also includes a user interface 1760 that enables user interaction with the computer 1700. The user interface 1760 may include I/O devices 1762 (e.g., keyboard, mouse, speakers, buttons, etc.) to allow the user to interact with the computer. Such input/output devices 1762 may be used in conjunction with a set of computer programs in accordance with embodiments described herein. The user interface also includes a display 1764. According to various embodiments, FIG. 17 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes to 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate embodiments described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
inputting a geometry of a substrate surface and manufacturing process parameters to a neural network, the neural network comprising a combination of a linear layer, non-linear activation functions, and a convolution layer, the neural network trained using one or more training sets, each training set comprising a different type of substrate geometry, and a collection of the manufacturing process parameters, the substrate surface configured to receive at least one droplet;
determining a shape of the at least one droplet after it has been deposited on the substrate surface based on an output of the neural network; and
producing a simulation output representing the determined shape of the at least one droplet.

2. The method of claim 1, wherein the shape comprises a 3D representation of the at least one droplet after it has deposited on the substrate surface.

3. The method of claim 1, wherein the one or more training sets comprise a surfaces of varying curvature, comprising one or more of a smooth surface, a rough surface, and a step-like surface.

4. The method of claim 1, wherein the geometry of the substrate surface comprises a 3D representation.

5. The method of claim 1, wherein the simulation output is a 3D representation of the shape obtained by determining the shape based on the geometry.

6. The method of claim 1, wherein the training set comprises droplet shapes determined using one or more of a high-fidelity model and a steady-state model.

7. The method of claim 1, further comprising estimating a shape of a product part based on the simulation output, the product part comprising a plurality of droplets.

8. A method comprising:
training a neural network using one or more training sets, each training set comprising a different type of substrate surface geometry, and a collection of manufacturing process parameters, the neural network comprising a combination of a linear layer, non-linear activation functions, and a convolution layer;
inputting a geometry of a substrate and the manufacturing process parameters to the neural network, the substrate configured to receive at least one droplet;
determining a shape of the at least one droplet after it has been deposited on the substrate based on an output of the neural network; and
producing a simulation output representing the determined shape of the at least one droplet.

9. The method of claim 8, wherein the shape comprises a 3D representation of the at least one droplet after it has deposited on the substrate.

10. The method of claim 8, wherein the one or more training sets comprise surfaces of varying curvature, comprising one or more of a curved surface, a highly curved surface, a rough surface, and a step-like surface.

11. The method of claim 8, wherein the geometry of the substrate comprises a 3D representation.

12. The method of claim 8, wherein the simulation output is a 3D representation of the shape obtained by determining the shape based on the geometry.

13. The method of claim 8, wherein the training set comprises droplet shapes determined using one or more of a high-fidelity model and a steady-state model.

14. The method of claim 8, further comprising estimating a shape of a product part based on the simulation output, the product part comprising a plurality of droplets.

15. A system, comprising:
a processor; and
a memory storing computer program instructions which when executed by the processor cause the processor to perform operations comprising:
inputting a geometry of a substrate surface and manufacturing process parameters to a neural network, the neural network comprising a combination of a linear layer, non-linear activation functions, and a convolution layer, the neural network trained using one or more training sets, each training set comprising a different type of substrate geometry, and a collection of manufacturing process parameters, the substrate surface configured to receive at least one droplet;
determining a shape of the at least one droplet after it has been deposited on the substrate surface based on an output of the neural network; and
producing a simulation output representing the determined shape of the at least one droplet.

16. The system of claim 15, wherein the shape comprises a 3D representation of the at least one droplet after it has deposited on the substrate surface.

17. The system of claim 15, wherein the one or more training sets comprise surfaces of varying curvature, comprising one or more of a curved surface, a highly curved surface, a rough surface, and a step-like surface.

18. The system of claim 15, wherein the geometry of the substrate surface comprises a 3D representation.

19. The system of claim 15, wherein the simulation output is a 3D representation of the shape obtained by determining the shape based on the geometry.

20. The system of claim 15, further comprising estimating a shape of a product part based on the output, the product part comprising a plurality of droplets.

* * * * *